United States Patent [19]
Wolter

[11] Patent Number: 5,207,172
[45] Date of Patent: May 4, 1993

[54] BOAT DECK COVERING AND METHOD FOR APPLYING SAME

[76] Inventor: Luitgard Wolter, Gartenweg 1, D-6114 Gros Umslat/Richen, Fed. Rep. of Germany

[21] Appl. No.: 794,468

[22] Filed: Nov. 19, 1991

[30] Foreign Application Priority Data

Nov. 30, 1990 [DE] Fed. Rep. of Germany ....... 4038181

[51] Int. Cl.⁵ .................................................. B63B 5/24
[52] U.S. Cl. ..................................... 114/357; 114/263; 52/181; 156/279
[58] Field of Search ............... 114/258, 259, 263, 264, 114/265, 355, 357; 428/446, 447, 907, 143, 212; 156/279, 295, 315; 52/181, 811

[56] References Cited

U.S. PATENT DOCUMENTS

| | | | |
|---|---|---|---|
| 4,555,292 | 11/1985 | Thompson | 114/263 |
| 4,662,972 | 5/1987 | Thompson | 114/263 |
| 4,947,785 | 8/1990 | Milne | 114/357 |

Primary Examiner—Jesus D. Sotelo
Assistant Examiner—Stephen P. Avila
Attorney, Agent, or Firm—Perman & Green

[57] ABSTRACT

A boat deck surface covering comprising at least two layers which are applied one over the other. The layers contain a slow hardening elastic resin, such as epoxy resin, a hardener or curing agent for the resin, and a solid particulate, finely divided filler material of low density. The underlayer contains a coloring agent or pigment for the simulation of white or black gap material, which is exposed through narrow strips or gaps in the top layer, preferably a wood plank-simulating surface layer, to produce a surface covering simulating a wooden plank pattern.

19 Claims, 2 Drawing Sheets

BOAT DECK COVERING AND METHOD FOR APPLYING SAME

BACKGROUND OF THE INVENTION

The present invention relates to durable and attractive boat deck covering or resurfacing materials, and to methods for repairing and/or resurfacing boat decks.

German Patent 3,201,251 describes the application of actual wooden planking to a boat hull made from fiberglass-reinforced plastic. The wooden planking is fastened to ribs which are integrated into the fiberglass-reinforced plastic boat hull. In this way an economical hull can be produced having the technical advantages of a plastic hull with the beauty of a true wooden planking deck.

It is known to use mixtures of polyurethane resin and wood chips to fill and repair damaged wooden parts. Such mixtures are not suitable for the coating or resurfacing of boat decks since they are semi-solid filler pastes for repairing small areas.

Wooden decks are not practical for use on steel or aluminum boats because leakage can lead to corrosion problems after just a few years, which can only be corrected by removing the deck. Decks of such metal boats generally are either painted or treated with a plastic-cork adhesive mixture. The paint must be renewed within a relatively short time, and the plastic-cork mixture is not durable, and is sensitive to damage at is edges and corners. This results in a loss of appearance due to repair work on the hull or the deck.

Plastic or fiberglass boats rarely have wooden decks since they are not essential and are only decorative. The application of wooden decks to such boats is difficult and therefore expensive.

It is desirable to produce durable and attractive covering or surfacing materials for a boat deck which can be applied easily, reliably, inexpensively and at any time, without requiring the removal of fittings such as clamps, winches, railing posts, etc., as present on sail boats, for example. The deck covering should need no special attention and should be very durable. It should also allow for the repair of leaky wooden boat decks without being so apparent as to destroy the natural appearance of the repaired deck.

SUMMARY OF THE INVENTION

The present invention relates to boat deck covering or resurfacing materials consisting of at least two layers, which are successively applied. The layers are made from a slowly-hardening, coatable elastic resin composition containing a hardener or curing agent for the resin, and a solid, granular or fine filler of low density e.g., wood chip, cork, saw dust, styropor or the like.

Saw dust or particle wood is preferred for use as a filler since it produces an attractive wooden appearance.

Standard epoxy resins can be used which exhibit slow hardening or curing times, i.e., long hardening times for example from three to forty-eight hours, twenty-four hours being preferable. Cross-linking agents of the amine type, for example tri-ethanol amine, or of the acidic hydride type, for example, phthalic acid hydride, are suitable hardeners or curing agents.

The selection of curable epoxy resin coating compositions and hardeners suitable for use according to the present invention will be apparent to those skilled in the art in light of the present disclosure.

It is known that curable epoxy resins can be mixed with diluting agents, solvents etc. to produce a flowable, coatable mixture having the required hardening times. Such mixtures employ epoxy resin and hardener in the ratio of 3:1 to 1:3 on a volume basis. In most cases a ratio of 1:1 is used.

The proportion of particulate filler relative to the total composition can be between 20% and 80%. A preferred composition is 25 vol. % epoxy resin, 25 vol. % hardener and 50 vol. % filler.

A coloring medium or pigment can be added to the composition to achieve a desired or required color.

This is especially useful when a decorative pattern is desired on the deck, such as a natural wooden planking appearance, whereby gaps between natural wooden planking can be simulated by using colors or pigments containing white, to simulate caulking, or black, to simulate tar.

A decorative pattern preferably is achieved according to the present invention, by using a masking technique. Parts of the underlayer(s) of deck covering which are not to receive the pattern of an overlayer, such as a wooden plank appearance, are masked off. This is often used when colored, gap-simulating, underlayers are present. Removal of the narrow masking strips, after application of the wood plank-simulating overlayer, produces a durable and attractive deck covering simulating the appearance of a wood plank deck.

DETAILED DESCRIPTION

Figure 1:
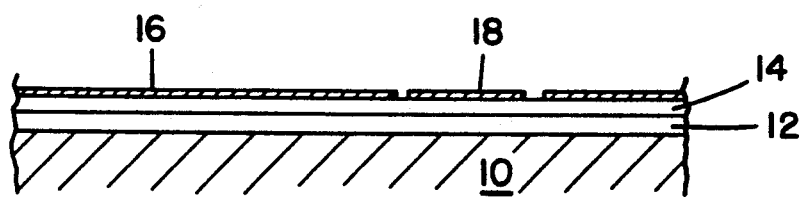
FIG. 1 is vertical section through an intermediate boat deck covering consisting of two coating layers and top masking strips.
Figure 2:
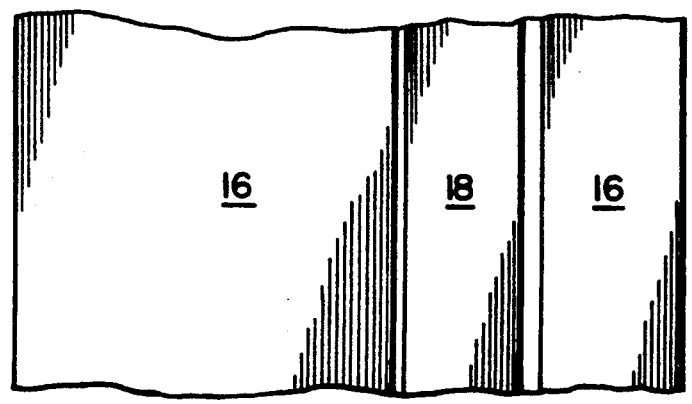
FIG. 2 is a plan view of the intermediate boat deck covering of FIG. 1.

Referring to the drawings, a boat deck 10, which may be unattractive, damaged or leaky, is covered by an undercoating or lower layer 12 of a composition comprising 25 parts by volume of epoxy resin, 20 parts by volume of hardener and 25 parts by volume of saw dust, as a uniform coating. After hardening of this layer 12, a second layer 14 of the same composition but also containing a coloring agent is applied over layer 12. This second layer 14 is colored to simulate the appearance of gap material between planks. After hardening of the layer 14, wide adhesive masking strips 16 and narrow adhesive masking strips 18 are applied, parallel to, but closely spaced from one another, to the hardened layer 14. Gaps between the adhesive strips should be as narrow as possible, as illustrated by FIGS. 1 and 2.

Figure 3:
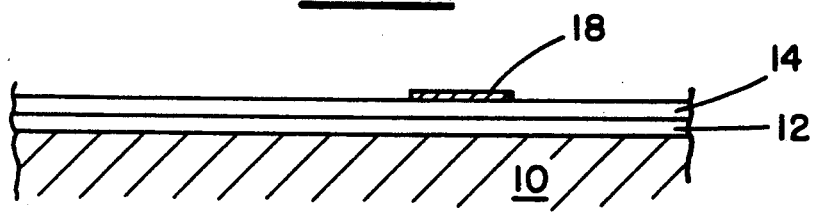
FIG. 3 illustrates the covering of FIG. 1 after removal of the adhesive masking strips 16.

The wide adhesive strips 16 are then removed, as illustrated by FIG. 3. Their only purpose is to ensure that the narrow adhesive strips are arranged parallel to each other on the boat deck covering.

Figure 4:
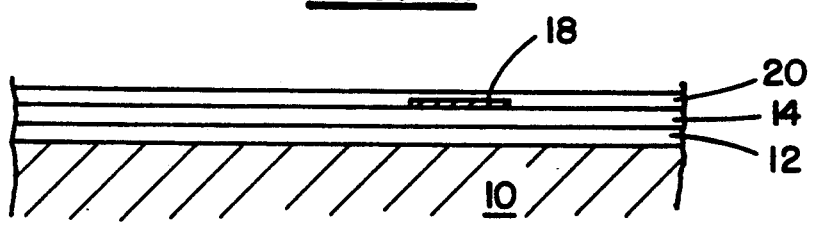
FIG. 4 illustrates the covering of FIG. 3 after application of an upper layer.
Figure 5:
FIG. 5 illustrates the completed covering after removal of the adhesive masking strips 18.

An upper layer 20 having the same wood-simulating appearance and composition as layer 12 is then applied over the hardened layer 14 and over the adhesive strips 18, as illustrated by FIG. 4. When the upper layer 20 has hardened to some extent but is still sufficiently soft and elastic, the narrow adhesive strips 18 are removed. The sites where the narrow adhesive strips 18 were removed now reveal the cured, colored layer 14 which simulates the color of gap material between planks, simulated by layer 20, as illustrated by FIG. 5.

Figure 6:
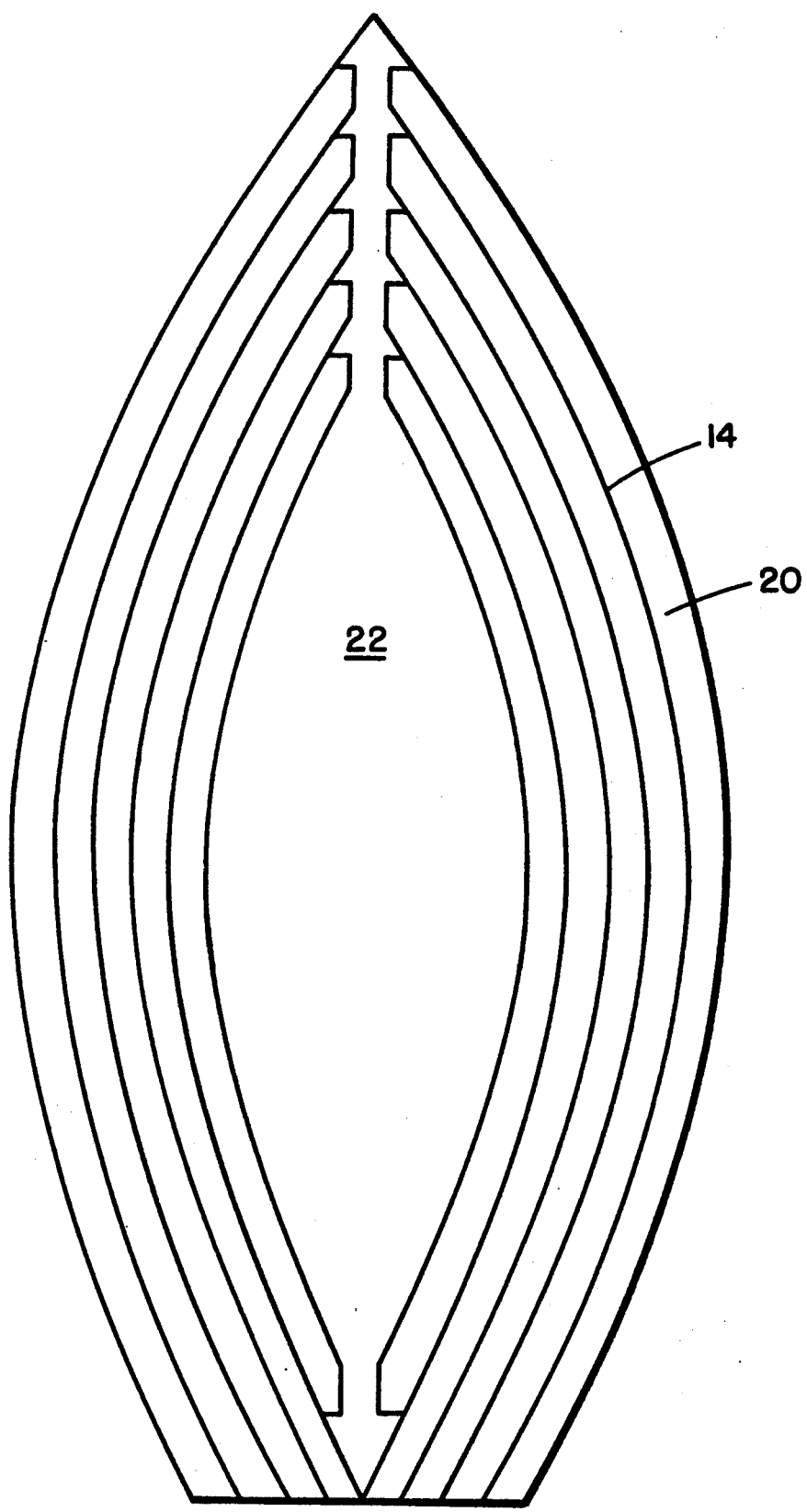
FIG. 6 is a plan view of the wood planking-simulating covering of a completed boat deck, applied according to the present invention.

In this manner, a boat deck covering is produced which imitates or simulates the appearance of natural wooden planking, as illustrated FIG. 6. In FIG. 6, the wider covering areas comprising upper layer 20 simulate wood planking, surrounded by narrow covering areas comprising the exposed layer 14 of different color, to simulate gap material present between wooden planks. In the center of the boat is a non-deck area 22, such as cabin space.

As illustrated by the drawings, the boat deck covering is applied in at least two layers. The lowest layer or undercoating is applied to the cleaned boat deck which requires treatment. This layer is allowed to harden to a point where subsequently applied layers will not be damaged. The application of overlayers after hardening of the underlayers can be repeated as often as required. In general, between two and five layers are applied to produce a resistant covering of the deck.

If a certain decorative pattern is required on the boat deck covering, use is made of the masking technique illustrated by the drawings. Adhesive foils or tapes, such as 18, are especially suitable as the masking medium. These foils or tapes can be removed after application of the upper layers to produce the desired effect.

A preferential application of this invention is the imitation or matching of boat deck wood planking. This technique can also be used to repair a wooden deck structure and subsequently cover it. One to four underlayers 12 are applied and hardened as already described in connection with the drawings. At least the uppermost underlayer 14 contains a coloring agent to simulate filled gaps between wooden planks. The gaps are normally quite distinguishable. To produce this result, white or black colors or pigments are added to the mixture.

After hardening of this colored layer 14, adhesive masking strips are applied. Wide strips 16 of the same width as the wooden planking and narrow strips 18 for the gaps are applied to the hardened underlayer 14, as shown by FIGS. 1 and 2. The wide strips 16 are then removed leaving the narrow strips 18 in place so masking the areas of the layer 14 below, as shown by FIG. 3.

On the so-masked layer 14, a top layer 20 containing saw dust filler is then applied and partially cured. Layer 20 gives the appearance of wooden planking. The narrow adhesive strips 16 are removed, while layer 20 is still soft or elastic, to reveal the "gaps" between the planks, comprising the exposed strips of the gap-simulating layer 14, as shown in FIG. 5.

After hardening of layer 20 there results a boat deck covering simulating a plank design, as shown by FIG. 6. This procedure can be performed as often as required, and the appearance is controlled by the width of the wide and narrow adhesive strips 16 and 18 and the colors used for layers 14 and 20.

The present method can also be used to repair and beautify boat decks in simple manner without altering the natural structure of the deck.

A principal advantage of the boat deck coverings of the present invention is the ease of application thereof to a new boat deck or as an alteration or repair of the deck at any time during the life thereof.

Old, worn and leaky wooden decks can be renovated and sealed in relatively simple manner. Slip-free surfaces can be produced by spreading sand or other slip-preventing material onto the new surface before hardening is complete. The appearance of an original wooden deck can be retained after repair work and furthermore the new deck covering requires no special care and is very durable.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

I claim:

1. A boat deck surface covering comprising at least two layers, applied one over the other, each said layer comprising a slow hardened elastic resin composition containing a hardener for the resin, and a solid particulate filler material of low density, the upper layer containing filler material which imparts to said layer the appearance of wood, and the underlayer containing coloring agent which imparts to said layer the appearance of gap material, narrow spaced portions of the upper layer being removed to expose portions of the underlayer and produce a deck covering simulating wood planking spaced by gap material.

2. Boat deck surface covering according to claim 1 wherein said resin is an epoxy resin, and the ratio of epoxy resin to hardener in said composition is from 3:1 to 1:3 vol. parts.

3. Boat deck surface covering according to claim 1 where the proportion of filler material is between 20 and 80 vol. % relative to the total amount of resin, hardener and filler in said composition.

4. Boat deck surface covering according to claim 1 wherein the ratio of resin, hardener and filler is approximately 25:25:50 vol. parts.

5. Boat deck surface covering according to claim 1 where the covering consists of a plurality of up to five layers.

6. Boat deck surface covering according to claim 1 where a coloring agent is present in one of said layers.

7. Boat deck covering according to claim 1 where the filler material consists of saw dust.

8. Boat deck surface covering according to claim 1 wherein at least the upper layer contains saw dust filler material.

9. Boat deck surface covering according to claim 1 wherein an anti-slip material is applied prior to final hardening of the layer forming the major upper surface of the deck covering.

10. Method for applying a durable surface covering to a boat deck comprising the steps of providing a curable coating composition containing a curable resin, a hardener and a solid particulate filler material of low density; applying at least one uniform coating of said composition to a boat deck to form at least one underlayer, the curable composition applied to form said underlayer being colored to simulate the appearance of gap material; hardening said underlayer; applying over said hardened underlayer at least one uniform coating of said composition to form at least one surface layer, the curable composition used to apply said surface layer containing a filler material which simulates the appearance of wood, curing said surface layer, and removing narrow strip areas of said surface layer to expose narrow line areas of said gap-simulating underlayer, to produce a durable deck surface covering which simulates the appearance of a wood plank, gap-filled deck.

11. Method according to claim 10 which comprises the step of applying narrow strips of removable masking tape over said cured underlayer, said strips being spaced from each other by wider areas of exposed underlayer; applying said wood-simulating surface layer over said narrow strips of masking tape and over said wider areas of exposed underlayer; partly curing said surface layer to an elastic condition; removing said coated strips of masking tape to expose said colored underlayer and completing the curing of said surface layer, present as wood plank-simulating areas separated by narrow gap-simulating areas of said colored underlayer.

12. Method according to claim 10 wherein said resin is an epoxy resin, and the ratio of epoxy resin to hardener in said curable composition is from 3:1 to 1:3 vol. parts.

13. Method according to claim 10 where the proportion of filler material is between 20 and 80 vol. % relative to the total amount of resin, hardener and filler in said curable composition.

14. Method according to claim 10 where the ratio of resin, hardener and filler material is approximately 25:25:50 vol. parts.

15. Method according to claim 10 which comprises hardening said layers for between three and forty-eight hours.

16. Method according to claim 15 where the hardening time is about twenty-four hours.

17. Method according to claim 10 which comprises applying a plurality of underlayers.

18. Method according to claim 10 where the filler material comprises saw dust.

19. Method according to claim 10 comprising applying sand as an anti-slip material prior to final hardening of the layer forming the upper surface of the deck covering.

* * * * *